(12) United States Patent
Liu et al.

(10) Patent No.: US 12,540,035 B2
(45) Date of Patent: Feb. 3, 2026

(54) CONTAINER STORAGE SYSTEM, WAREHOUSING SYSTEM AND ROBOT

(71) Applicant: BEIJING GEEKPLUS TECHNOLOGY CO., LTD., Beijing (CN)

(72) Inventors: Kai Liu, Beijing (CN); Mengdi Wang, Beijing (CN)

(73) Assignee: BEIJING GEEKPLUS TECHNOLOGY CO., LTD., Beijing (CN)

( * ) Notice: Subject to any disclaimer, the term of this patent is extended or adjusted under 35 U.S.C. 154(b) by 966 days.

(21) Appl. No.: 17/641,099

(22) PCT Filed: Aug. 18, 2020

(86) PCT No.: PCT/CN2020/109866
§ 371 (c)(1),
(2) Date: Mar. 8, 2022

(87) PCT Pub. No.: WO2021/103668
PCT Pub. Date: Jun. 3, 2021

(65) Prior Publication Data
US 2022/0332506 A1 Oct. 20, 2022

(30) Foreign Application Priority Data

Nov. 29, 2019 (CN) .......................... 201911203891.X

(51) Int. Cl.
*B65G 1/137* (2006.01)
*B25J 5/00* (2006.01)
(Continued)

(52) U.S. Cl.
CPC ............ *B65G 1/1375* (2013.01); *B25J 5/007* (2013.01); *B25J 9/1679* (2013.01);
(Continued)

(58) Field of Classification Search
CPC .. B65G 1/1375; B65G 1/1378; B65G 1/0492; B65G 1/1373; B65G 2201/0235;
(Continued)

(56) References Cited

U.S. PATENT DOCUMENTS 3,561,619 A * 2/1971 Weir .................... B65G 1/1378
414/281
10,138,060 B1 11/2018 Mantha et al.
(Continued)

FOREIGN PATENT DOCUMENTS

CN 101460380 A 6/2009
CN 201923656 U 8/2011
(Continued)

OTHER PUBLICATIONS

CN-107516142-A (Year: 2017).*
CN-109969674-A (Year: 2019).*
Xiaowen Ge, China Logistics Key Project Report 2013, 2013, pp. 466-485, China Fortune Publishing House.

*Primary Examiner* — Ernesto A Suarez
*Assistant Examiner* — Laurence R Brothers
(74) *Attorney, Agent, or Firm* — Bayramoglu Law Offices LLC

(57) ABSTRACT

Provided are a container storage system, a warehousing system, a robot control method, and a robot; the container storage system comprises an inventory area, a control server, a robot, and a plurality of workstations; the control server communicates with the robot wirelessly; an inventory rack is placed in the inventory area; the inventory rack comprises at least one layer of layered panels; the at least one layer of layered panels divides the inventory rack into at least two layers; at least two storage containers are placed on the inventory rack in the direction of the depth of the layered panels, and the direction of width of the storage container on the inventory rack is consistent with the direction of the depth of the layered panels. The system increases the storage (Continued)

density of storage containers in the inventory area, and reduces the energy consumption of the robot picking the storage containers.

7 Claims, 6 Drawing Sheets

(51) Int. Cl.
| | | |
|---|---|---|
| *B25J 9/16* | (2006.01) | |
| *B25J 15/00* | (2006.01) | |
| *B25J 19/00* | (2006.01) | |
| *B65G 1/02* | (2006.01) | |
| *B65G 1/04* | (2006.01) | |
| *B66F 9/06* | (2006.01) | |
| *B25J 9/02* | (2006.01) | |
| *B66F 9/14* | (2006.01) | |

(52) U.S. Cl.
CPC ....... *B25J 15/0014* (2013.01); *B25J 15/0052* (2013.01); *B25J 19/00* (2013.01); *B65G 1/02* (2013.01); *B65G 1/04* (2013.01); *B65G 1/0492* (2013.01); *B65G 1/1373* (2013.01); *B65G 1/1378* (2013.01); *B66F 9/063* (2013.01); *B65G 2201/0235* (2013.01); *G05B 2219/40298* (2013.01)

(58) Field of Classification Search
CPC ..... B65G 2209/06; B25J 5/007; B25J 9/1679; B25J 15/0014; B25J 9/1664; B25J 9/1689; B25J 15/0004; B25J 15/0052; G05B 2219/40298; B66F 9/063; B66F 9/141

See application file for complete search history.

(56) References Cited

U.S. PATENT DOCUMENTS

| | | | |
|---|---|---|---|
| 2006/0245862 A1* | 11/2006 | Hansl | ................... B65G 1/0435 |
| | | | 414/281 |
| 2012/0219397 A1 | 8/2012 | Baker et al. | |
| 2016/0355337 A1* | 12/2016 | Lert | ..................... B65G 1/0492 |
| 2017/0174431 A1* | 6/2017 | Borders | ................. B65G 67/22 |
| 2018/0127212 A1* | 5/2018 | Jarvis | ..................... G05D 1/247 |
| 2018/0290830 A1 | 10/2018 | Valinsky et al. | |

FOREIGN PATENT DOCUMENTS

| | | | | |
|---|---|---|---|---|
| CN | 102612476 A | | 7/2012 | |
| CN | 104169196 A | | 11/2014 | |
| CN | 104903922 A | | 9/2015 | |
| CN | 106477217 A | | 3/2017 | |
| CN | 107516142 A | * | 12/2017 | |
| CN | 207226454 U | | 4/2018 | |
| CN | 108408315 A | | 8/2018 | |
| CN | 108408316 A | | 8/2018 | |
| CN | 109102205 A | | 12/2018 | |
| CN | 109516227 A | | 3/2019 | |
| CN | 109573449 A | | 4/2019 | |
| CN | 109911503 A | | 6/2019 | |
| CN | 109969674 A | * | 7/2019 | ............. B25J 13/00 |
| CN | 110498172 A | | 11/2019 | |
| CN | 110506014 A | | 11/2019 | |
| CN | 110879578 A | | 3/2020 | |
| CN | 110921170 A | | 3/2020 | |
| EP | 3135609 A1 | | 3/2017 | |
| JP | 2008019017 A | | 1/2008 | |
| JP | 2012236683 A | | 12/2012 | |
| JP | 2016210547 A | | 12/2016 | |
| JP | 2017128405 A | | 7/2017 | |
| WO | WO-2013112907 A1 | * | 8/2013 | ............ B25J 9/1676 |

* cited by examiner

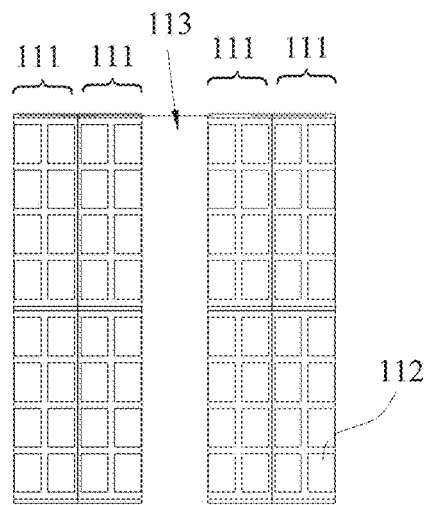
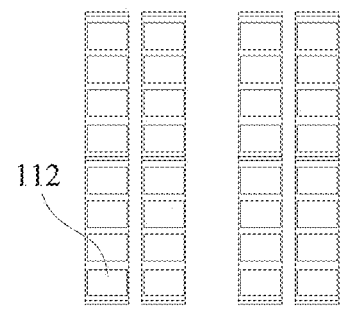
FIG. 2A
FIG. 2B
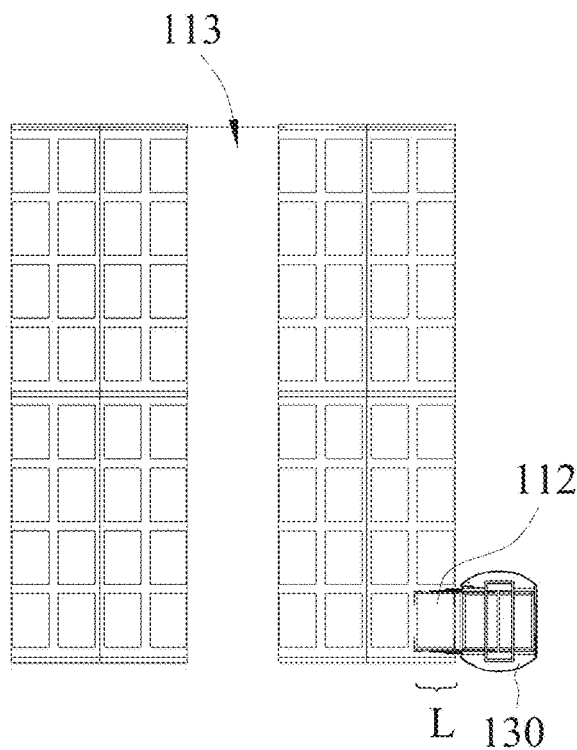
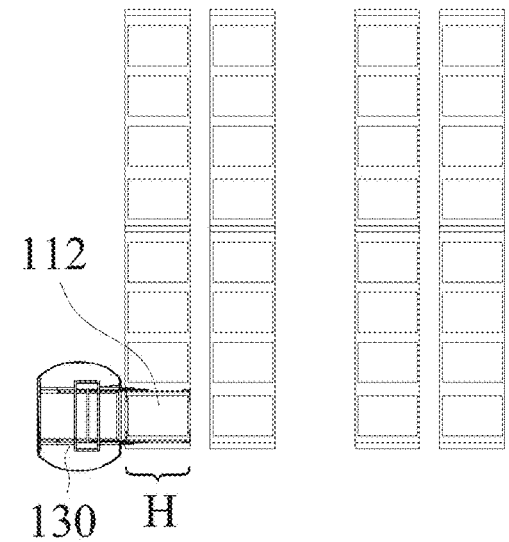
FIG. 3A
FIG. 3B

FIG. 5C                          FIG. 5D

CONTAINER STORAGE SYSTEM, WAREHOUSING SYSTEM AND ROBOT

CROSS REFERENCE TO THE RELATED APPLICATIONS

The present application is a national phase entry under 35 U.S.C. § 371 of International Application No. PCT/CN2020/109866, filed on Aug. 18, 2020, which claims the priority from Chinese Patent Application No. 201911203891.X, filed with the China National Intellectual Property Administration on Nov. 29, 2019 and entitled "Container Storage System, Warehousing System, Robot Control Method and Robot", which is hereby incorporated by reference in its entirety.

TECHNICAL FIELD

The present application relates to the field of storage technology, and in particular to a container storage system, a warehousing system and a robot.

BACKGROUND

With the rapid development of e-commerce, the e-commerce as an essential requirement of everyday life has become more important for users. The number of user orders has increased exponentially every year, and the users have higher requirements for the quality of e-commerce services. So how to complete the order fulfillment with high efficiency, low cost, flexibility and accuracy is a huge challenge faced by every e-commerce service company.

With the increase in the transaction volume of online shopping, the e-commerce companies have established warehouse centers in various places in order to deliver products more quickly. A warehouse needs to store a large amount of item types and item inventory. Therefore, warehouses are required to have the ability for quickly completing order picking.

At present, a bin-to-person scheme is used for the case picking or piece picking, that is, ordinary loft-style shelves are used, and the robot runs on the floor of the loft without special tracks. The bin taking mechanism of the robot can be raised and lowered, and is used to take the bins on the shelf board with a different height on the same floor. The robot can take a single bin at a time and send it to an operating station. After the picking is finished at the station, the robot returns the bin into the shelf. A lifting mechanism is installed in the loft to lift robots, bins or both at the same time, so that the bins can be taken to the operating station on different floors, and can be returned to the shelves on different floors when they are returned. In the existing bin-to-person scheme, the storage density of bins in the warehouse is relatively low. How to achieve the high storage density of bins is an urgent problem to be solved.

SUMMARY

In view of this, the embodiments of the present application provide a container storage system, a warehousing system, a robot control method and a robot, so as to solve the technical defects in the prior art.

According to a first aspect of the embodiments of the present application, the present application provides a container storage system including an inventory frame in an inventory area, the inventory frame includes at least one board that makes the inventory frame have at least two levels, and at least two storage containers are arranged in a depth direction of the board on the inventory frame; and the width direction of the storage containers on the inventory frame is consistent with the depth direction of the board.

According to a second aspect of the embodiments of the present application, the present application provides a warehousing system including: an inventory area, a control server, a robot and a plurality of work stations, wherein the control server communicates with the robot wirelessly;

the inventory area is provided with an inventory frame including at least one board that makes the inventory frame have at least two levels, at least two storage containers are arranged in a depth direction of the board on the inventory frame, and the width direction of the storage containers on the inventory frame is consistent with the depth direction of the board;

the control server is configured to: in response to an order task, determine a target work station, a target storage container and a target robot for executing the order task, plan a travel path for the target robot, and send a control command to the target robot; the target robot is configured to: in response to the control command, travel to a position of an inventory frame including the target storage container according to the planned travel path, take out the target storage container from the inventory frame and transport it to the target work station.

According to a third aspect of the embodiments of the present application, the present application provides a robot control method, including:

in response to an order task, determining a target work station, a target storage container and a target robot for executing the order task, planning a travel path for the target robot, and sending a control command to the target robot; wherein the inventory frame is located in an inventory area of a warehousing system, the inventory frame located in the inventory area includes at least one board that makes the inventory frame have at least two levels, at least two storage containers are arranged in a depth direction of the board on the inventory frame; and the width direction of the storage containers on the inventory frame is consistent with the depth direction of the board;

the control command is used to instruct the target robot to walk to a position of an inventory frame including the target storage container according to the planned travel path, take out the target storage container from the inventory frame and transport the target storage container to the target work station.

According to a fourth aspect of the embodiments of the present application, the present application provides a robot control method, including:

in response to a control command, travelling to an inventory frame position where a target storage container is located according to the planned travel path, taking out the target storage container from the inventory frame and transporting the target storage container to a target work station.

Optionally, two storage containers that are adjacent to each other along the depth direction of the board are taken out from the inventory frame, wherein the target storage container is one of the two storage containers, and the taken-out target storage container is transported to the target work stations corresponding respectively to the order tasks.

Optionally, the robot control method further includes: in response to the first control command, travelling to the position of the inventory frame including the target storage container according to the planned first travel path, taking out the target storage container and a storage container adjacent to the target storage container along the depth direction of the board of the inventory frame from the inventory frame, and transporting the taken-out target storage container and adjacent storage container to a first target work station.

Optionally, after transporting the taken-out target storage container and adjacent storage container to the first target work station, the method further includes:

in response to the second control command, transporting a second target container to a second target work station according to the planned second travel path, wherein the second target container is the first target storage container and/or the storage container adjacent to the first target storage container taken out by the target robot.

According to a fifth aspect of the embodiments of the present application, the present application provides a robot, including:

a mobile chassis provided with a driving wheel mechanism for driving the mobile chassis to move and used to realize liner movement and turning movement of the robot on the floor;

a temporary storage rack arranged on the mobile chassis to place storage containers;

a container taking component arranged on the mobile chassis and including at least two pairs of fingers extendable and retractable horizontally relative to the mobile chassis to take out at least two storage containers adjacent to each other along the depth direction of a board from the inventory frame.

According to a sixth aspect of the embodiments of the present application, there is provided a computing device including a memory, a processor, and computer instructions stored on the memory and executable on the processor, wherein the processor implements the steps of the above method when executing the instructions.

According to a seventh aspect of the embodiments of the present application, there is provided a computer-readable storage medium storing computer instructions, which implement the steps of the above method when executed by a processor.

In the container storage system, warehousing system, robot control method and robot provided by the embodiments of the present application, at least two storage containers are placed along the depth direction of the board on the inventory frame in the inventory area, and the width direction of the storage containers on the inventory frame is consistent with the depth direction of the board, improving the storage density of the storage containers in the inventory area. In the process during which the robot takes out the storage container, the extension length of the telescopic component is significantly reduced. On the one hand, the energy consumption of the robot when taking out the storage container is reduced, and the total amount of work that the robot can complete is increased and the picking cost is saved on a single charge of the robot; and on the other hand, the telescopic component of the robot is in the suspension state, and if the extension length of the telescopic component of the robot is long, the operation stability of the telescopic component is reduced in the process during which the telescopic component takes out the storage container, which speeds up the wear of the telescopic component and shortens the service life of the robot. In this embodiment, the extension length of the telescopic component of the robot during the process of taking out the storage container is reduced, the operation stability of the telescopic component is improved, the wear of the telescopic component is reduced, and the service life of the robot is increased.

BRIEF DESCRIPTION OF THE DRAWINGS

FIG. 2A is a schematic diagram for describing the placement of storage containers on an inventory frame according to embodiments of the present application.

FIG. 2B is a schematic diagram for describing the placement of storage containers on an inventory frame in the prior art.

FIG. 3A is a schematic diagram for describing that a robot takes out a storage container from the inventory frame according to embodiments of the present application.

FIG. 3B is a schematic diagram for describing that a robot takes out a storage container from the inventory frame in the prior art.

FIGS. 5A, 5B, 5C and 5D are schematic diagrams illustrating the working process of the robot according to embodiments of the present application.

DETAILED DESCRIPTION OF THE EMBODIMENTS

Many specific details are illustrated in the following description so as to fully understand the present application. But the present application can be implemented in many other ways different from that described here, and those skilled in the art can make the similar modifications without violating the connotation of the present application. Therefore, the present application is not limited by the specific implementations disclosed below.

The terms used in one or more embodiments of this specification are only for the purpose of describing specific embodiments, but not intended to limit one or more embodiments of this specification. The singular forms of "a/an", "said" and "the" used in one or more embodiments of this specification and the appended claims are also intended to include plural forms, unless the context clearly indicates other meanings. It should also be understood that the term "and/or" used in one or more embodiments of this specification refers to and includes any or all possible combinations of one or more associated listed items.

It should be understood that the terms "first", "second", etc. may be used to describe various information in one or more embodiments of this specification, but these information should not be limited to these terms. These terms are only used to distinguish the same type of information from each other. For example, "first" may also be referred to as "second", and similarly, "second" may also be called "first", without departing from the scope of one or more embodiments of this specification. Depending on the context, the word "if" as used herein can be interpreted as "in the case of" or "in the case when" or "in response to determination".

In the present application, a container storage system, a warehousing system, a robot control method, a robot, a computing device, and a computer-readable storage medium are provided, which are described in detail one by one in the following embodiments.

First Embodiment

Figure 1:
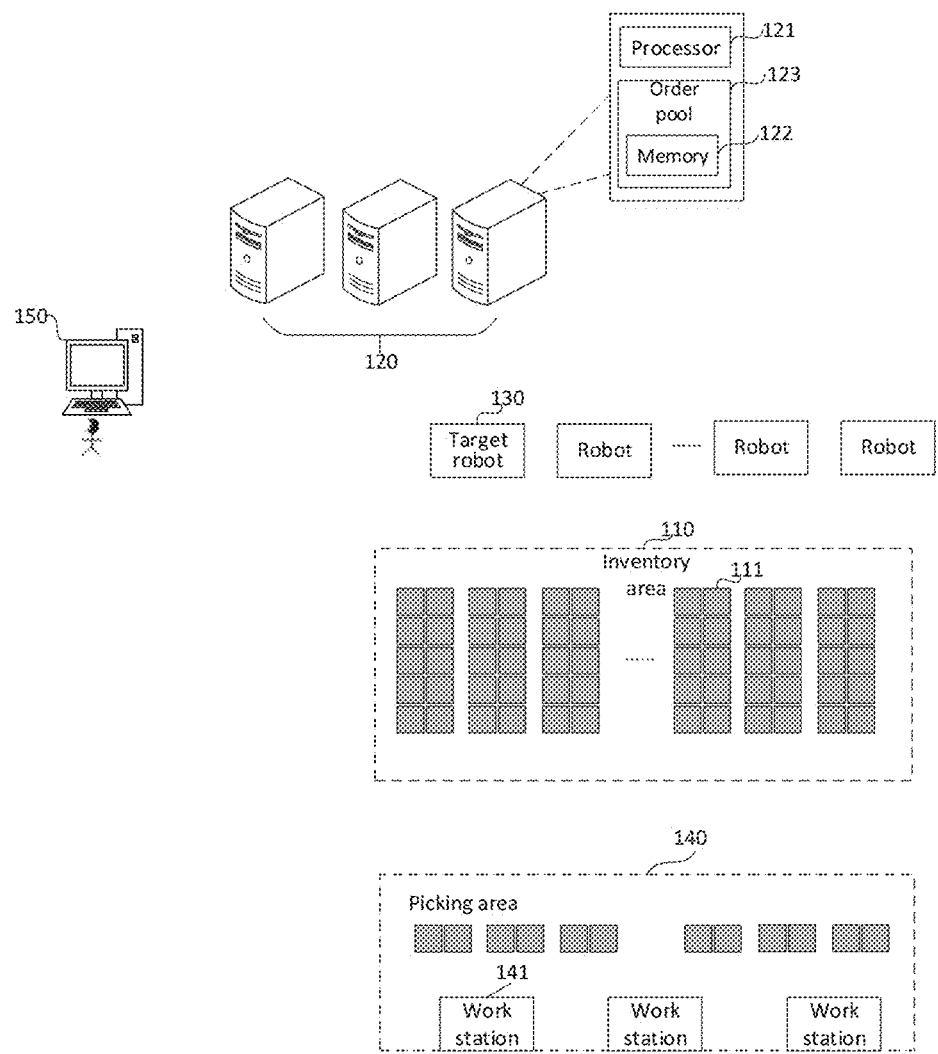
FIG. 1 is a structural schematic diagram of a warehousing system according to embodiments of the present application.

Referring to the structural schematic diagram of a warehousing system shown in FIG. 1, the system includes: an inventory area 110, a control server 120, robots 130, and a plurality of work stations 141 in a picking area 140.

The inventory area 110 is provided with inventory frames 111 each including at least one board that makes the inventory frame have at least two levels. At least two storage containers 112 are provided along the depth direction of the board on the inventory frame, and the width direction of the storage containers 112 on the inventory frame 111 is consistent with the depth direction of the board.

The number of storage containers 112 that can be placed along the depth direction on the inventory frame 111 may be determined according to actual needs. For example, two storage containers 112 or three storage containers 112 or more can be placed. The number of storage containers 112 placed along the depth direction on the inventory frame 111 is not limited in the present application.

In addition, since different types of items are stored in the inventory area 110, the storage containers where the items are located have different specifications. According to the actual situation, the storage containers with the same specification can be placed on the above-mentioned inventory frame 111, or the storage containers with different specifications can be placed on the inventory frame 111.

The control server 120 wirelessly communicates with the robot 130, the staff can make the control server 120 work through the console 150, and the robot 130 performs corresponding tasks under the control of the control server 120. The control server 120 may be a software system running on a server and having the data storage and information processing capabilities, and may be connected to the access equipment, robot, hardware input system and other software systems through a wireless network or a wired network. The control server 120 can also be a server or a server cluster including a plurality of servers, and can be a centralized control architecture or a distributed computing architecture. The control server 120 may have a processor 121 and a memory 122, and there may be an order pool 123 in the memory 122.

The work station 141 in the picking area 140 can be called a picking station in the picking scenario. The storage container 112 on the inventory frame 111 is transported to the work station 141, and the picking staff or picking device at the work station 141 performs the picking operation on the storage container 112 to realize the case picking and/or piece picking.

A customer has the demand for picking goods and confirms an order, and the upstream system sends the order task to the control server after receiving the order from the customer. The pick-up request may include the information of the order to be processed, which may include items to be picked, quantity thereof, etc.

In the following, the control server 120 determines the location of the target storage container where the item to be picked is located in response to the pick-up request. How to transport the target storage container to achieve the picking will be specifically illustrated below.

The control server 120 in the warehousing system is configured to: in response to an order task, determine a target work station, a target storage container and a target robot for executing the order task, plan a travel path for the target robot, and send a control command to the target robot 130.

The target storage container is the storage container where the item to be picked is located, and the target storage container needs to be transported to the target work station for picking. The inventory frame 111 where the target storage container is located and the target robot that takes out the target storage container 112 on the inventory frame 111 are determined.

The target robot 130 is configured to: in response to the control command, travel to the position of the inventory frame 111 including the target storage container 112 according to the planned travel path, take out the target storage container 112 from the inventory frame 111 and transport it to the target work station.

In this embodiment, at least two storage containers are placed along the depth direction of the board on the inventory frame 111 in the inventory area 110, and the width direction of the storage containers on the inventory frame 111 is consistent with the depth direction of the board, improving the storage density of the storage containers in the inventory area 110.

In the process during which the robot 130 takes out the target storage container on the inventory frame 111, the telescopic components of the robot 130 extend to both sides of the target storage container respectively. The extension length of the telescopic component only needs to be slightly larger than the width of the storage container 112, which can accelerate the speed of taking out the target storage container on the inventory frame 111, reducing the time for transporting the target storage container to the work station 141, and then improving the picking efficiency. Furthermore, in the process during which the robot 130 takes out the target storage container, the extension length of the telescopic component is reduced, lowering the energy consumption of the robot when taking out the target storage container. Thus the robot can complete more work on a single charge, thereby saving picking cost.

A first application scenario is exemplified below to further illustrate this embodiment.

FIG. 2A shows the placement of storage containers 112 in the storage area 110 of the warehousing system. Two storage containers 112 are placed along the depth direction on the inventory frame 111, the width direction of the storage containers 112 on the inventory frame 111 is consistent with the depth direction of the board of the inventory frame 111, and there is a channel 113 for the robot 130 to walk between two adjacent inventory frames. FIG. 2B shows the placement of storage containers 112 in the storage area of the existing warehousing system. In the case of the same storage area per level of the inventory frame and the same height of the inventory frame, the storage area of the existing warehousing system can accommodate 4,720 bins, while the storage area 110 of the warehousing system provided by the present application can accommodate 5,500 bins. Compared with the existing warehousing system, the storage density of the warehousing system provided by this embodiment is increased by 17%, realizing the high-density storage of storage containers.

A second application scenario is exemplified below to further illustrate this embodiment.

It is assumed that the length and width of the storage container 112 on the inventory frame 111 are 600 mm and 400 mm, respectively.

FIG. 3A illustrates that a robot takes out a storage container 112 in the warehousing area 110 of the warehousing system in this embodiment. The robot 130 takes out a storage container 112, the extension length of the telescopic component of the robot 130 only needs to be slightly larger than the width of 400 mm of the storage container 112, and the first extended length L of the telescopic component of the robot 130 is 450 mm. Therefore, upon completing the taking-out of the storage container, the working distance of the telescopic component of the robot 130 to take out the storage container is 900 mm.

Referring to FIG. 3B illustrating that the existing robot takes out a storage container in the warehousing area of the warehousing system. The extension length of the telescopic component of the robot 130 is slightly larger than the length of 600 mm of the storage container 112. In the process of taking out a storage container 112 by the robot 130, the extension length H of the telescopic component of the robot 130 shown is 650 mm. Therefore, upon completing the taking-out of a single storage container, the working distance of the telescopic component of the robot 130 reaches 1300 mm.

As can be seen from the above practical application scenario, when completing the taking-out of a storage container, the working distance of the telescopic component of the robot 130 in this embodiment can be reduced by 30.7% compared with the existing one, thus significantly accelerating the speed of taking out the storage container on the inventory frame 111, reducing the time for transporting the target storage container to the work station, and then improving the picking efficiency.

Furthermore, in the process during which the robot 130 takes out the storage container, the extension length of the telescopic component is significantly reduced. On the one hand, the energy consumption of the robot 130 while taking out the storage container is reduced, and the total amount of work that the robot can complete is increased and the picking cost is saved on a single charge of the robot 130. On the other hand, the telescopic component of the robot is in the suspension state, and if the extension length of the telescopic component of the robot 130 is long, the operation stability of the telescopic component is reduced in the process during which the telescopic component takes out the storage container, which speeds up wear of the telescopic component 5 and shortens the service life of the robot. In this embodiment, the extension length of the telescopic component of the robot 130 during the process of taking out the storage container is reduced, the operation stability of the telescopic component is improved, the wear of the telescopic component 5 is reduced, and the service life of the robot is increased.

Second Embodiment

This embodiment provides a technical solution on the basis of the foregoing first embodiment, and the warehousing system of this embodiment will be described below.

The control server 120 is further configured to: in response to at least two order tasks, where the target storage container corresponding to the first order task in the at least two order tasks and the target storage container corresponding to the second order task in the at least two order tasks are at least one of two storage containers adjacent to each other along the depth direction of the same board, determine the target work stations, target storage containers and target robots that execute the first order task and the second order task; plan the travel paths for the target robots; and send the control commands for executing the first order task and the second order task to the target robots.

The target robot is further configured to, in response to the control command, travel to the position of the inventory frame including the target storage container according to the travel path, take out two storage containers including the target storage container and being adjacent to each other along the depth direction of the board from the inventory frame, and transport the taken-out target storage container to the target work stations corresponding respectively to the first order task and the second order task.

The control server 120 responds to at least two order tasks at a time, wherein the at least two order tasks include a first order task and a second order task, and the target storage containers corresponding to the first order task and the second order task are at least one of two storage containers adjacent to each other along the depth direction of the same board.

For ease of description, among the two adjacent storage containers along the depth direction of the same board, the storage container at the outer side of the inventory frame 111 is taken as the outer container, and the storage container at the inner side of the inventory frame 111 is taken as the inner container. The target storage containers corresponding to the first order task and the second order task may be the inner container and outer container, respectively; or the target storage containers corresponding to the first order task and the second order task may be the outer container and inner container, respectively.

The target robot 130 transports the target storage container corresponding to the second order task to the corresponding work station 141 after transporting the target storage container corresponding to the first order task to the work station corresponding to the target storage container. There is no need to schedule other robot to take out a storage container to be transported to the work station according to the second order task, and only a single target robot is required to complete two order tasks, increasing the number of orders that the target robot can complete in a single transportation, which not only greatly improves the picking efficiency but also improves the working efficiency of the robot.

In addition, the target robot 130 needs to take out two storage containers 112 adjacent to each other along the depth direction of the board of the inventory frame 111, and it is assumed that the length and width of the storage container 112 on the inventory frame are 600 mm and 400 mm, respectively.

Figure 4:
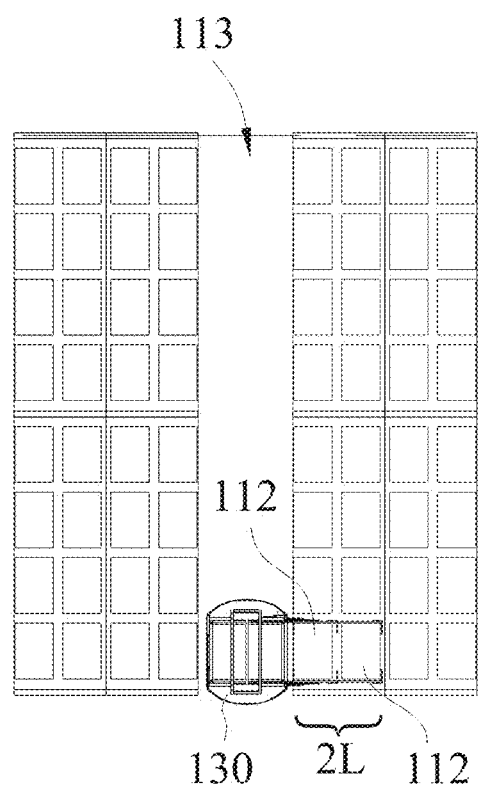
FIG. 4 is a schematic diagram for describing that a robot transports two storage containers according to embodiments of the present application.

Referring to FIG. 4, the extension length of the telescopic component of the robot 130 is slightly larger than the length of 400 mm of the storage container 112. In the process during which the robot 130 takes out two adjacent storage containers 112, the extension length 2L of the telescopic component of the robot 130 is 900 mm. Therefore, when completing the taking-out of two storage containers, the working distance of the telescopic component of the robot 130 reaches 1800 mm.

The working distance of the telescopic component of the robot 130 to take out the two storage containers is shortened, which can accelerate the speed of taking out the storage containers on the inventory frame 111, reducing the time for transporting the target storage containers to the work stations, and further improving the picking efficiency.

Third Embodiment

This embodiment provides a technical solution on the basis of the foregoing first embodiment, and the warehousing system of this embodiment will be described below.

The control server 120 is further configured to: in response to a first order task, determine a first target work station, a first target storage container and a target robot for executing the first order task, plan a first travel path for the target robot, and send a first control command for executing the first order task to the target robot;

The target robot 130 is further configured to: in response to the first control command, travel to the position of the inventory frame including the target storage container according to the planned first travel path, take out the first target storage container and a storage container adjacent to the first target storage container along the depth direction of the board of the inventory frame from the inventory frame, and transport the taken-out first target storage container and the adjacent storage container to the first target work station.

The control server 120 is further configured to: in the process during which the target robot transports the first target storage container to the first target work station in response to the first control command, in response to a second order task of which the corresponding second target container is the first target storage container and/or the storage container adjacent to the first target storage container taken out by the target robot, determine a second target work station executing the second order task, plan a second travel path for the target robot, and send a second control command for executing the second order task to the target robot.

The target robot 130 is further configured to: in response to the second control command, transport the second target storage container to the second target work station according to the planned second travel path.

The working process of the target robot 130a in this embodiment will be schematically described below with reference to FIGS. 5A to 5D, wherein the dashed lines in FIGS. 5B and 5C indicate the travel path of the target robot 130a.

In response to a first order task, the control server 120 determines a first target work station 141a, a first target storage container 112a and a target robot 130a for executing the first order task, plans a first travel path for the target robot 130a, and sends a first control command for executing the first order task to the target robot 130a.

Figures 5A, 5B:
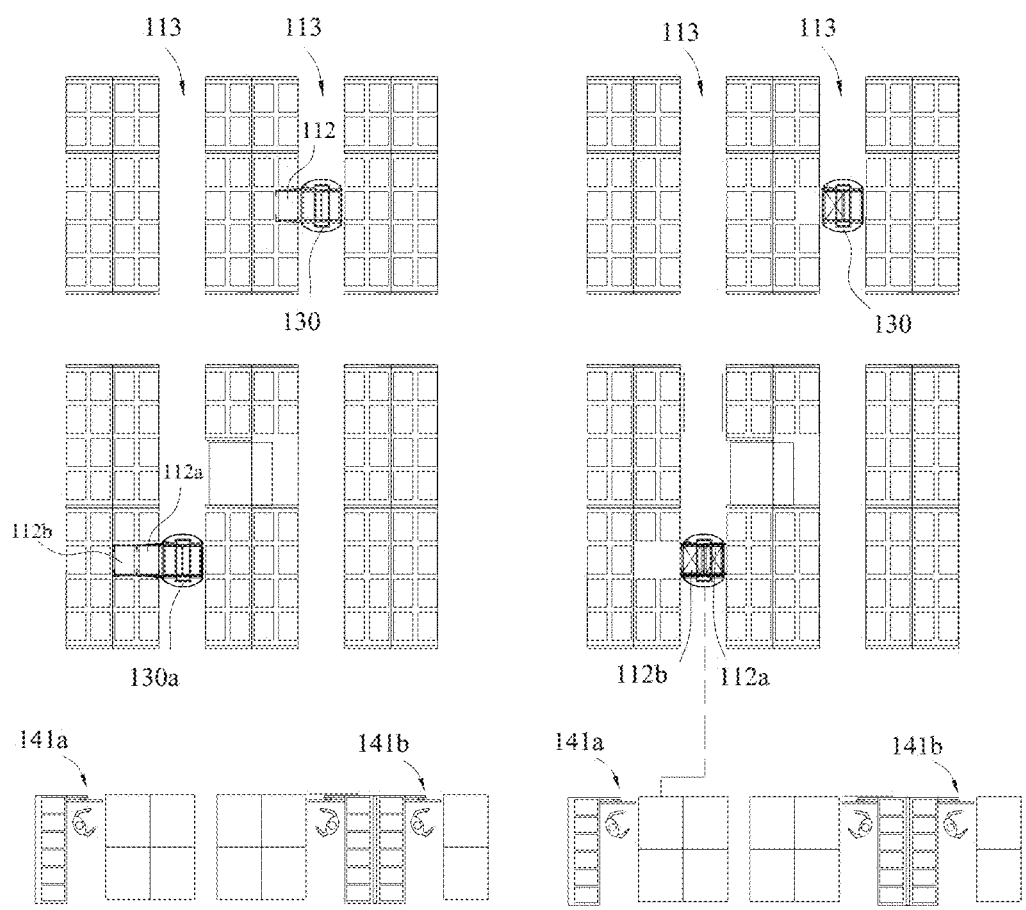

Referring to FIG. 5A, the target robot 130a travels to the position of the inventory frame 111 including the target storage container 112a according to the first travel path in response to the first control command.

Referring to FIG. 5B, the target robot 130a takes out the first target storage container 112a and a storage container adjacent to the first target storage container 112a along the depth direction of the inventory frame from the inventory frame 111.

Referring to FIG. 5C, the target robot 130a transports the taken-out first target storage container 112a to the work station 141a corresponding to the target storage container, and the staff or picking device at the work station 141a performs the picking operation on the target storage container 112a. In the process from responding to the first control command to transporting the first target storage container 112a to the first target work station 141a, when the second target storage container 112b corresponding to the second order task is the adjacent storage container taken out by the target robot 130a, the target robot 130a determines the second target work station 141b corresponding to the second target storage container 112b corresponding to the second order task in response to the second order task.

Referring to FIG. 5D, the target robot 130a transports the second target storage container 112b corresponding to the second order task to the second target work station 141b according to the planned second travel path.

In this embodiment, the target robot takes out the first target storage container and the storage container adjacent to the first target storage container along the depth direction of the board of the inventory frame from the inventory frame in response to the first order task. The first target storage container is firstly transported by the target robot to the first target work station, while the storage container adjacent to the first target storage container along the depth direction of the board of the inventory frame is not determined as a target storage container. The target robot can also respond to the second control command in the process from responding to the first control command to transporting the first target storage container to the first target work station, so that the target robot transports the second target storage container (which may include the first target storage container and/or the storage container adjacent to the first target storage container) corresponding to the second order task to the second target work station after transporting the first target storage container corresponding to the first order task to the first target work station. There is no need to schedule other robot to take out the second target storage container to be transported to the work station according to the second order task, increasing the number of order tasks that the target robot can complete in a single transportation, which not only greatly improves the picking efficiency but also improves the utilization rate of the robot.

Fourth Embodiment

Figure 6:
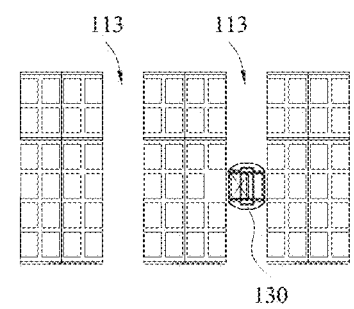
FIG. 6 is a structural schematic diagram of a robot according to embodiments of the present application.
Figure 6:
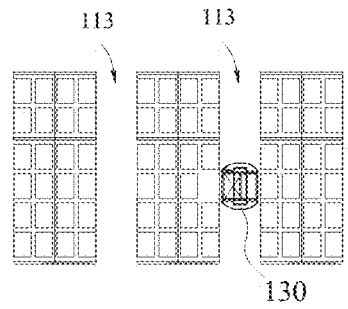
Figure 6:
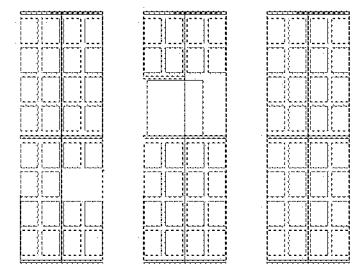
Figure 6:
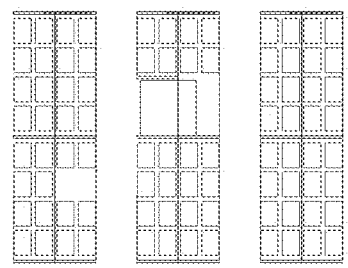
Figure 6:
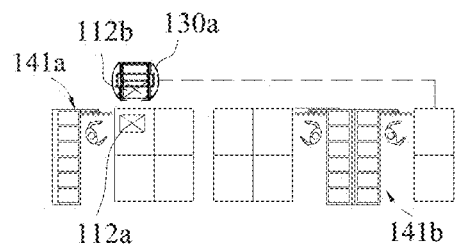
Figure 6:
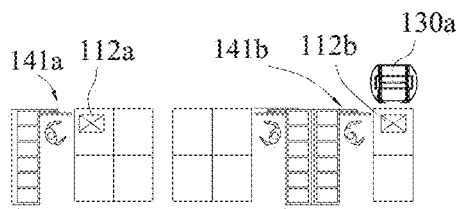
Figure 6:
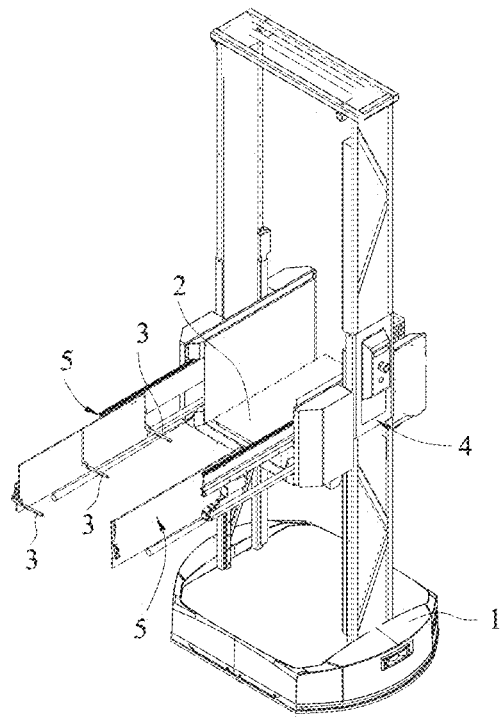

As shown in FIG. 6, this embodiment provides a robot, including:
- a mobile chassis 1 provided with a driving wheel mechanism for driving the mobile chassis 1 to move, and used to realize the straight-line movement and turning movement of the robot on the floor;
- a temporary storage rack 2 arranged on the mobile chassis 1 to place storage containers;
- a container taking component arranged on the mobile chassis 1 and including at least two pairs of fingers 3 extensible and retractable horizontally relative to the mobile chassis 1 to take out at least two storage containers adjacent to each other along the depth direction of a board from the inventory frame.

In this embodiment, the container taking component includes at least two pairs of fingers 3 extensible and retractable horizontally relative to the mobile chassis 1 to enable the robot to take out at least two storage containers adjacent to each other along the depth direction of the board on the inventory frame. In the case when the target storage containers corresponding to more than two order tasks are two storage containers taken out by the robot, the robot can complete multiple order tasks after taking out more than two storage containers at once, and only a single robot is required to complete more than two order tasks, increasing the number of orders that the target robot can complete in a single transportation, which not only greatly improves the picking efficiency but also improves the working efficiency of the robot.

Specifically, the container taking component includes three pairs of fingers 3 extensible and retractable horizontally relative to the mobile chassis 1 to take out two storage containers adjacent to each other along the depth direction of the board from the inventory frame.

By arranging three pairs of fingers 3, the storage container may be located between two adjacent pairs of fingers 3 during the process of taking out two adjacent storage containers, avoiding the shaking of the storage containers during the process of taking out the storage containers and ensuring that the storage containers can be taken out stably.

A lifting adjustment component 4 is arranged on the mobile chassis 1 to achieve the take-in and take-out of the storage container on the boards with differential heights in the inventory frame.

A telescopic component 5 is arranged on the lifting adjustment component 4 and capable of lifting up and down vertically followed by the lifting adjustment component 4, and the telescopic component 5 is connected with the container taking component to drive the container taking component to extend and retract horizontally to achieve the take-in and take-out of the storage container on the inventory frame.

Fifth Embodiment

A robot control method provided by this embodiment includes:
  in response to an order task, determining a target work station, a target storage container on an inventory frame and a target robot for executing the order task, planning a travel path for the target robot, and sending a control command to the target robot;
  wherein the inventory frame is located in the inventory area of the warehousing system, the inventory frame includes at least one board that makes the inventory frame have at least two levels, at least two storage containers are arranged along the depth direction of the board on the inventory frame; and the width direction of the storage containers on the inventory frame is consistent with the depth direction of the board;
  the control command is configured to instruct the target robot to travel to a position of an inventory frame including the target storage container according to the planned travel path, take out the target storage container from the inventory frame and transport it to the target work station.

In an optional implementation of the embodiment of the present application, two storage containers are arranged adjacent to each other on the inventory frame along the depth direction of the board.

In an optional implementation of the embodiment of the present application, in response to at least two order tasks where the target storage container corresponding to the first order task in the at least two order tasks and the target storage container corresponding to the second order task in the at least two order tasks are at least one of two storage containers adjacent to each other along the depth direction of the same board, the target work stations, target storage containers and target robots that execute the first order task and the second order task are determined, the travel paths are planned for the target robots, and the control commands for executing the first order task and the second order task are sent to the target robots.

The control commands are used to instruct the target robots to travel to positions of the inventory frame including the target storage containers according to the travel paths, take out two storage containers including the target storage container and being adjacent to each other along the depth direction of the board from the inventory frame, and transport the taken-out target storage container to the target work stations corresponding respectively to the first order task and the second order task.

In the robot control method provided by the present application, in the process during which the robot 130 takes out the target storage container on the inventory frame 111, the telescopic components of the robot 130 extend to both sides of the target storage container respectively. The extension length of the telescopic component only needs to be slightly larger than the width of the storage container 112, thus accelerating the speed of taking out the target storage container on the inventory frame 111, reducing the time for transporting the target storage container to the work station 141, and then improving the picking efficiency. Furthermore, in the process during which the robot 130 takes out the target storage container, the extension length of the telescopic component is reduced, lowering the energy consumption of the robot when taking out the target storage container. The robot can complete more work on a single charge, thereby saving the picking cost.

Furthermore, the control server 120 responds to at least two order tasks at a time, wherein the at least two order tasks include a first order task and a second order task, and the target storage containers corresponding to the first order task and the second order task are at least one of two storage containers adjacent to each other along the depth direction of the same board. The target robot 130 transports the target storage container corresponding to the second order task to the corresponding work station 141 after transporting the target storage container corresponding to the first order task to the work station corresponding to the target storage container. There is no need to schedule other robot to take out a storage container to be transported to the work station according to the second order task, and only a single target robot is required to complete two order tasks, increasing the number of orders that the target robot can complete in a single transportation, which not only greatly improves the picking efficiency but also improves the working efficiency of the robot.

Sixth Embodiment

Figure 7:
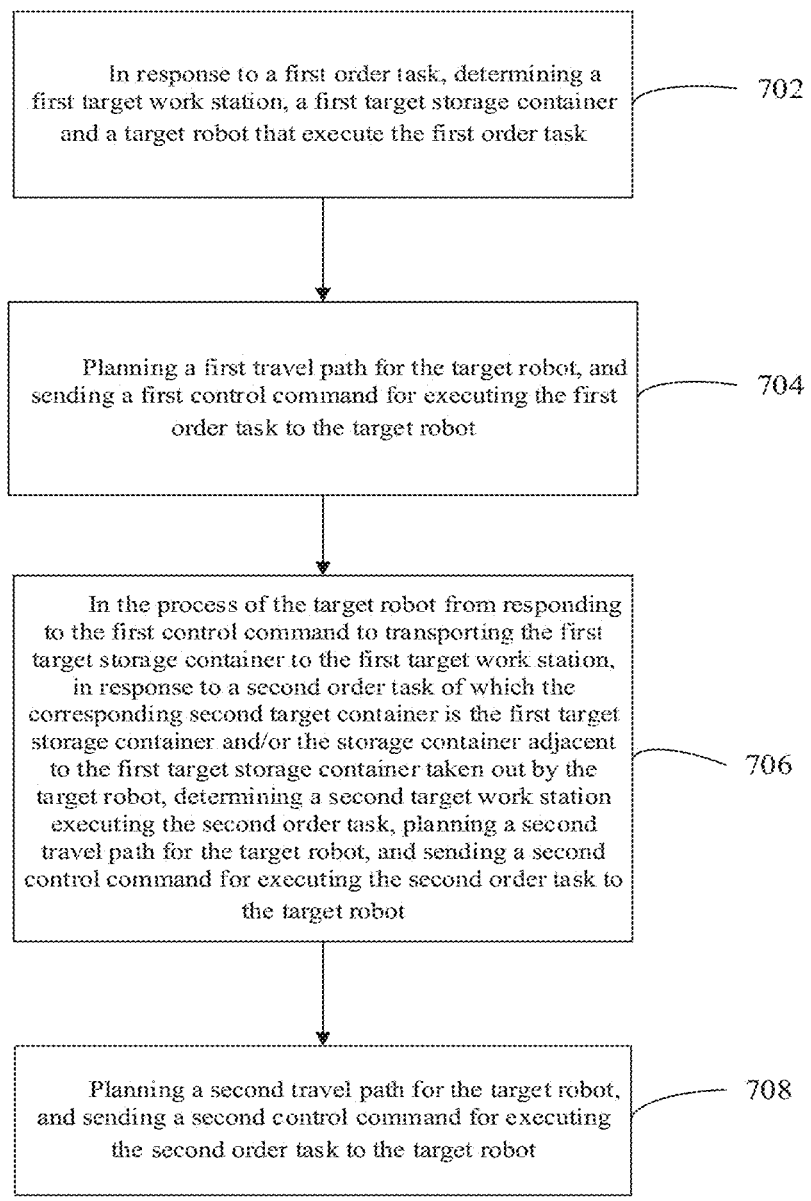
FIG. 7 is a schematic flowchart of a robot control method according to embodiments of the present application.

FIG. 7 is a schematic flowchart of a robot control method provided by this embodiment. The method can be performed by the warehousing system of the above embodiment, and the robot control method provided by this embodiment includes the following.

Step 702: in response to a first order task, determining a first target work station, a first target storage container and a target robot that execute the first order task.

Step 704: planning a first travel path for the target robot, and sending a first control command for executing the first order task to the target robot.

The first control command is used to instruct the target robot to travel to the position of the inventory frame including the target storage container according to the planned first travel path, take out the first target storage container and a storage container adjacent to the first target storage container along the depth direction of the board of the inventory frame from the inventory frame, and transport the taken-out first target storage container and adjacent storage container to the first target work station.

Step 706: in the process of the target robot from responding to the first control command to transporting the first target storage container to the first target work station, in response to a second order task of which the corresponding second target container is the first target storage container and/or the storage container adjacent to the first target storage container taken out by the target robot, determining a second target work station for executing the second order task.

Step 708: planning a second travel path for the target robot, and sending a second control command for executing the second order task to the target robot.

The second control command is used to instruct the target robot to transport the second target storage container to the second target work station according to the planned second travel path.

In this embodiment, the target robot can also respond to the second control command in the process from responding to the first control command to transporting the first target storage container to the first target work station, so that the target robot transports the second target storage container corresponding to the second order task to the second target work station after transporting the first target storage container corresponding to the first order task to the first target work station. There is no need to schedule other robot to take out the second target storage container to be transported to the work station according to the second order task, increasing the number of order tasks that the target robot can complete in a single transportation, which not only greatly improves the picking efficiency but also improves the utilization rate of the robot.

Seventh Embodiment

This embodiment provides a robot control method, including:
in response to a control command, traveling to a position of an inventory frame including a target storage container according to the planned travel path, taking out the target storage container from the inventory frame and transporting it to a target work station.

In an optional implementation of the embodiment of the present application, the step of taking out the target storage container from the inventory frame and transporting it to a target work station includes:
taking out two storage containers including the target storage container and being adjacent to each other along the depth direction of the board from the inventory frame, and transporting the taken-out target storage container to the target work stations corresponding respectively to the first order task and the second order task.

In an optional implementation of the embodiment of the present application, the method further includes: in response to the first control command, traveling to the position of the inventory frame including the target storage container according to the planned first travel path, taking out the target storage container and a storage container adjacent to the target storage container along the depth direction of the board of the inventory frame from the inventory frame, and transporting the taken-out target storage container and adjacent storage container to a first target work station.

In an optional implementation of the embodiment of the present application, after transporting the taken-out target storage container and adjacent storage container to the first target work station, the method further includes:
in response to the second control command, transporting a second target container to a second target work station according to the planned second travel path, wherein the second target container is the first target storage container and/or the storage container adjacent to the first target storage container taken out by the target robot.

This embodiment realizes the control of the robot 130 by responding to the control command sent by the control server 120. Cooperating with the warehousing system provided by the above embodiment, in the case of different order tasks, the scheduling robot 130 realizes the transportation of the storage containers placed on the inventory frame 111, reducing the number of times of robot transportation, reducing the number of robots, and increasing the number of orders that the robot can complete in a single transportation. This not only improves the article picking efficiency but also improves the work efficiency of the robot 130.

Eighth Embodiment

This embodiment provides a container storage system including an inventory frame located in an inventory area, the inventory frame includes at least one board that makes the inventory frame have at least two levels, and at least two storage containers are arranged along a depth direction of the board on the inventory frame; and the width direction of the storage containers on the inventory frame is consistent with the depth direction of the board.

The container storage system provided by this embodiment cooperates with the robot 130. In the process during which the robot 130 takes out a storage container, the working distance of the telescopic component of the robot 130 is shortened, thus accelerating the speed of taking out the storage container on the inventory frame 111, reducing the time for transporting the target storage container to the work station, and then improving the picking efficiency.

In an optional implementation of the embodiment of the present application, two storage containers are arranged adjacent to each other on the inventory frame along the depth direction of the board.

In the above solution, the storage method of the storage containers can increase the number of storage containers that can be stored per unit space, thereby reducing the warehousing cost of articles.

In an optional implementation of the embodiment of the present application, the inventory frame is a double-sided rack.

In an optional implementation of the embodiment of the present application, two storage containers are arranged adjacent to each other along the depth direction of the board on each of two sides of the inventory frame.

An embodiment of the present application further provides a computing device including a memory, a processor, and computer instructions stored in the memory and executable on the processor, wherein the processor implements the steps of the above robot control method when executing the instructions.

An embodiment of the present application further provides a computer-readable storage medium storing computer instructions, which implements the steps of the above robot control method when executed by a processor.

The above is a schematic solution of a computer-readable storage medium of this embodiment. It should be noted that the technical solution of the storage medium and the technical solution of the above robot control method belong to the same concept, and the details that are not described in detail in the technical solution of the storage medium can refer to the description of the technical solution of the above robot control method.

The above describes specific embodiments of this specification. Other embodiments are within the scope of the appended claims. In some cases, the actions or steps described in the claims may be performed in a different order from that in the embodiments and can still achieve the desired results. In addition, the processes depicted in the drawings do not necessarily require the shown specific order or sequential order to achieve the desired results. In certain embodiments, multitasking and parallel processing are also possible or may be advantageous.

The computer instructions include computer program codes, which may be in the form of source codes, in the form of object codes, executable files, or in certain intermediate forms, etc. The computer-readable medium may include: any entity or device capable of carrying the computer program codes, recording medium, U disk, mobile hard disk, magnetic disk, optical disk, computer memory, Read-Only Memory (ROM), Random Access Memory (RAM), electrical carrier signal, telecommunication signal, and software distribution medium, etc. It should be noted that the content contained in the computer-readable medium can be appropriately added or deleted according to the requirements of the legislation and patent practice in the jurisdiction. For example, in some jurisdictions, the computer-readable media do not include electrical carrier signals and telecommunication signals according to the legislation and patent practice.

It should be noted that, regarding the foregoing method embodiments, for simplicity of description, they are all expressed as a series of action combinations, but those skilled in the art should know that the present application is not limited by the described sequence of actions, because some steps can be performed in other order or simultaneously according to the present application. Secondly, those skilled in the art should also know that the embodiments described in the specification are all preferred embodiments, and the involved actions and modules are not necessarily all required by the present application.

In the above-mentioned embodiments, the description of each embodiment has its own emphasis. For parts that are not detailed in a certain embodiment, the reference may be made to the related descriptions of other embodiments.

The preferred embodiments of the present application disclosed above are only used to help explain the present application. The optional embodiments do not describe all the details in detail, and do not limit the invention to only the described specific embodiments either. Obviously, many modifications and changes can be made according to the content of this specification. This specification selects and specifically describes these embodiments in order to better explain the principle and practical applications of the present application, so that those skilled in the art can understand and use the present application well. The present application is only limited by the claims and their full scope and equivalents.

The invention claimed is:
1. A robot control method, applied to a warehousing system, wherein the warehousing system comprises:
an inventory area;
a control server;
a robot; and
a plurality of work stations;
wherein the control server communicates with the robot wirelessly;
the inventory area is provided with an inventory frame comprising at least one board which makes the inventory frame have at least two levels, and at least two storage containers are arranged in a depth direction of the board on the inventory frame; wherein the depth direction is a horizontal direction extending away from a viewer;
the control server is configured to: in response to an order task, determine a target work station, a target storage container and a target robot for executing the order task, plan a travel path for the target robot, and send a control command to the target robot;
the target robot is configured to: in response to the control command, travel to a position of an inventory frame containing the target storage container according to the planned travel path, take out the target storage container from the inventory frame and transport the target storage container to the target work station;
wherein the method comprises:
in response to at least two order tasks where a target storage container corresponding to a first order task in the at least two order tasks and a target storage container corresponding to a second order task in the at least two order tasks are at least one of two storage containers adjacent to each other along a depth direction of a same board, determining target work stations, at least one target storage container and a target robot for executing the first order task and the second order task, planning a travel path for the target robot, and sending control commands for executing the first order task and the second order task to the target robot;
instruct the target robot to move to a position of an inventory frame including the at least one target storage container according to the travel path, take out two storage containers including the at least one target storage container and being adjacent to each other along the depth direction of the same board from the inventory frame and transport the at least one target storage container to the target work stations corresponding to the first order task and the second order task respectively.

2. The robot control method according to claim 1, wherein the two storage containers are arranged in a depth direction of the board on the inventory frame.

3. The robot control method according to claim 1, the robot comprises telescopic components, wherein the telescopic components extend to both sides of the target storage container respectively, in order to take out the target storage container.

4. The robot control method according to claim 1, wherein instruct the target robot to transport the at least one target storage container to the target work stations corresponding to the first order task and the second order task respectively, comprising:
instruct the target robot to transport the target storage container corresponding to the second order task to the work station corresponding to the second order task after transporting the target storage container corresponding to the first order task to the work station corresponding to the first order task.

5. A robot control method, applied to a warehousing system, wherein the warehousing system comprises:
an inventory area;
a control server;
a robot; and
a plurality of work stations;
wherein the control server communicates with the robot wirelessly;
the inventory area is provided with an inventory frame comprising at least one board which makes the inventory frame have at least two levels, and at least two storage containers are arranged in a depth direction of the board on the inventory frame; wherein the depth direction is a horizontal direction extending away from a viewer;

the control server is configured to: in response to an order task, determine a target work station, a target storage container and a target robot for executing the order task, plan a travel path for the target robot, and send a control command to the target robot;

the target robot is configured to: in response to the control command, travel to a position of an inventory frame containing the target storage container according to the planned travel path, take out the target storage container from the inventory frame and transport the target storage container to the target work station;

wherein the method comprises:

in response to a first order task, determining a first target work station, a first target storage container and a target robot for executing a first order task, plan a first travel path for the target robot, and send a first control command for executing the first order task to the target robot;

the first control command used to instruct the target robot to move to a position of an inventory frame including the first target storage container according to the first travel path, take out the first target storage container and a storage container adjacent to the first target storage container along the depth direction of a board of the inventory frame where the first target storage container is placed from the inventory frame, and transport the first target storage container and the storage container adjacent to the first target storage container to the first target work station;

in a process during which the target robot transports the first target storage container to the first target work station in response to the first control command, in response to a second order task, determine a second target work station for executing the second order task, plan a second travel path for the target robot, and send a second control command for executing the second order task to the target robot; wherein a second target container corresponding to the second order task is either the first target storage container or the storage container adjacent to the first target storage container taken out by the target robot;

the second control command is used to instruct the target robot to transport the second target storage container to the second target work station according to the second travel path.

6. The robot control method according to claim 5, wherein the target robot is instructed to transport the second target storage container corresponding to the second order task to the second target work station after transporting the first target storage container corresponding to the first order task to the first target work station.

7. A control method of a robot, the robot comprises:
  a mobile chassis provided with a driving wheel mechanism for driving the mobile chassis to move, and used to realize linear movement and turning movement of the robot on floor;
  a temporary storage rack arranged on a lifting adjustment component to place storage containers;
  a lifting adjustment component arranged on the mobile chassis to pick and place storage containers at different height positions on an inventory frame;
  a telescopic component arranged on the lifting adjustment component and capable of lifting up and down vertically followed by the lifting adjustment component, wherein the telescopic component is connected with a container taking component to drive the container taking component to extend and retract horizontally to pick and place storage containers on the inventory frame;
  a container taking component arranged on the mobile chassis and comprising at least two pairs of fingers extendable and retractable horizontally relative to the mobile chassis;

the robot control method, comprising:
in response to a control command, moving to a position of an inventory frame where a target storage container is located according to a planned travel path;
taking out two storage containers including the target storage container and being adjacent to each other along a depth direction of a board of the inventory frame where the target storage container is placed from the inventory frame, transporting the target storage container to target work stations corresponding to a first order task and a second order task respectively; wherein the depth direction is a horizontal direction extending away from a viewer;
wherein a target storage container corresponding to a first order task and a target storage container corresponding to a second order task are at least one of two storage containers adjacent to each other along a depth direction of a same board which are taken out.

* * * * *